Oct. 17, 1961   R. E. SWINGLE   3,004,746
METHOD AND APPARATUS FOR SECURING SHIFTABLE LOADS
Filed July 21, 1958   2 Sheets-Sheet 1
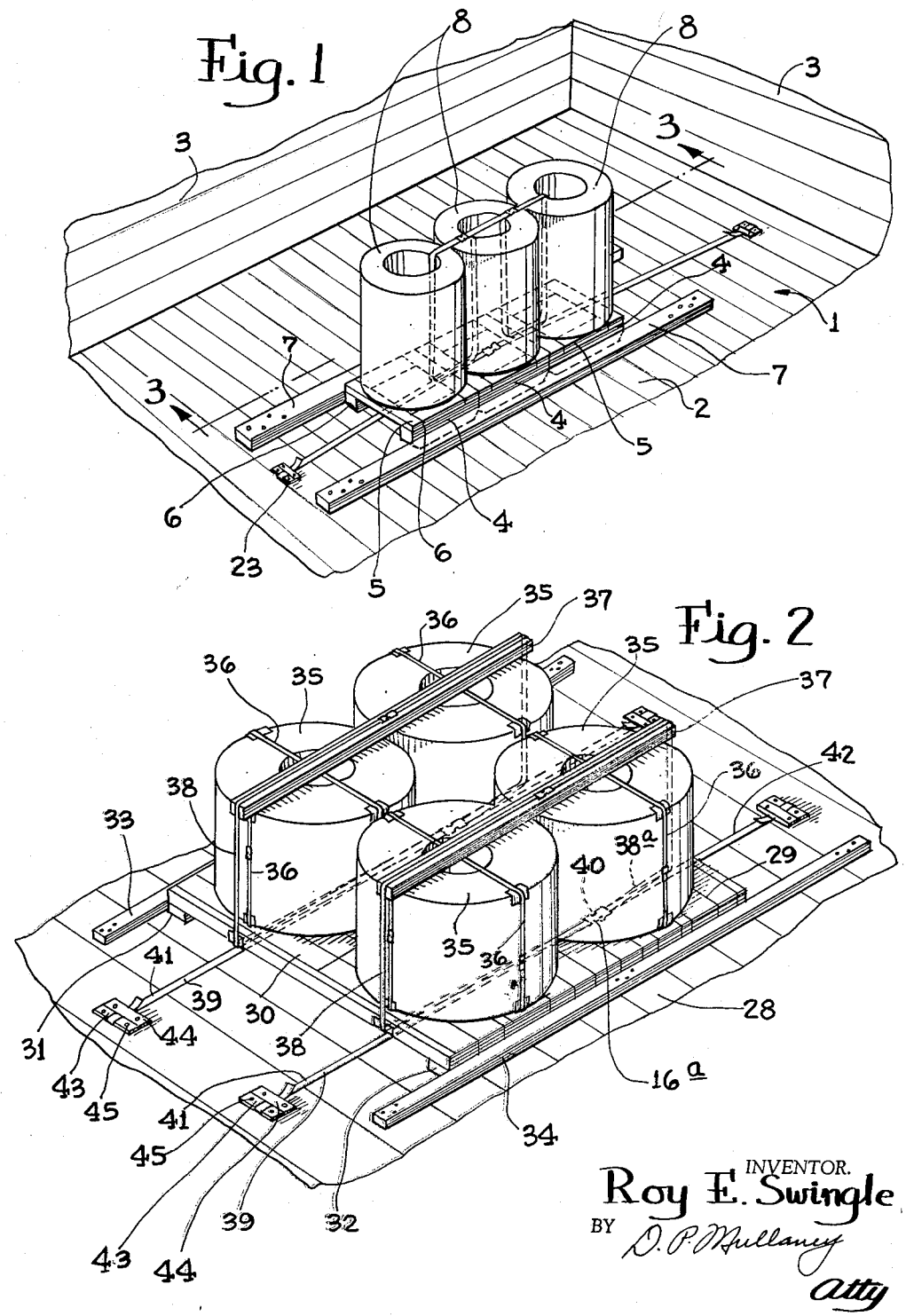
INVENTOR.
Roy E. Swingle
BY D. P. Mullany
atty

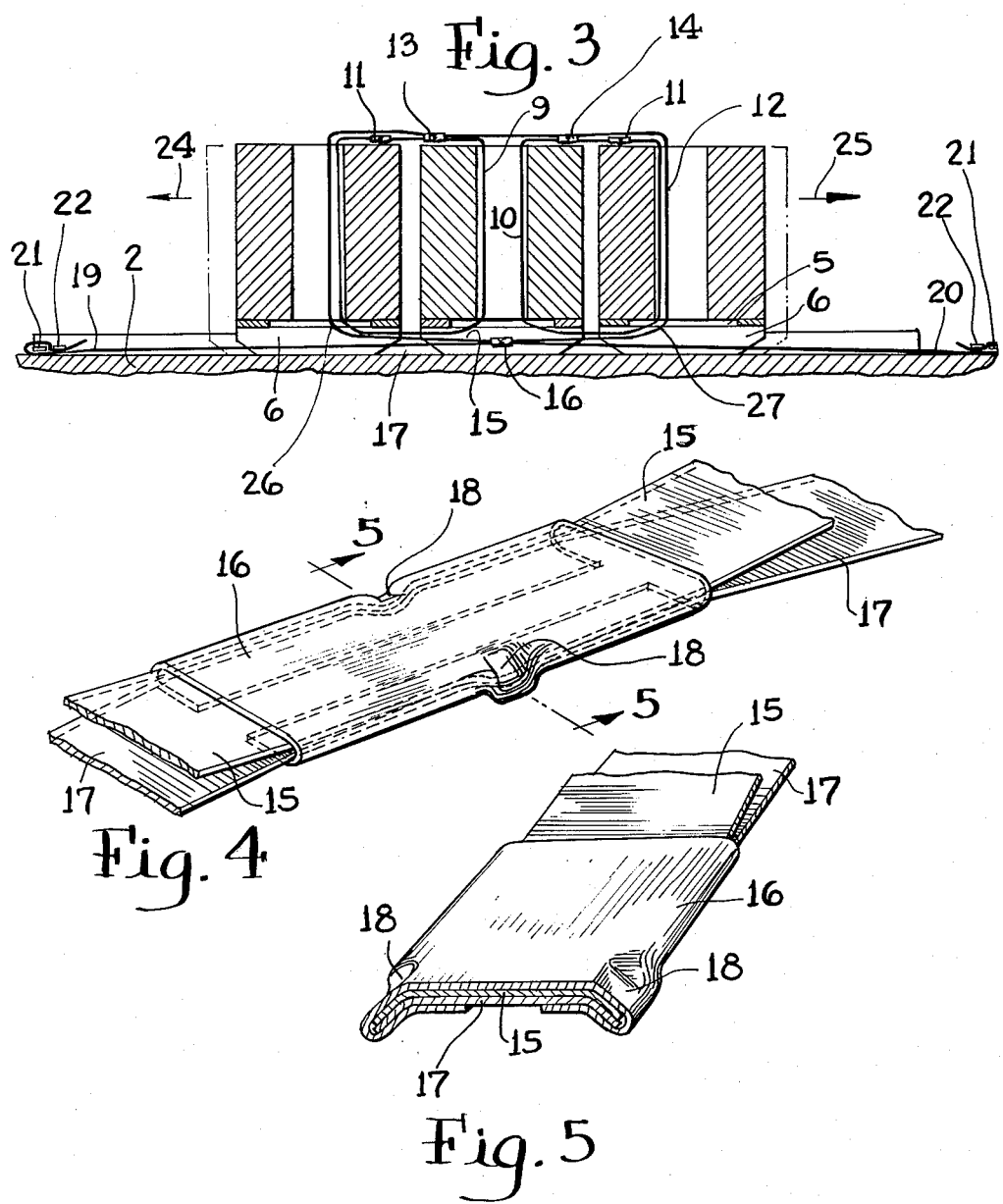

United States Patent Office 3,004,746
Patented Oct. 17, 1961

3,004,746
METHOD AND APPARATUS FOR SECURING SHIFTABLE LOADS
Roy E. Swingle, Park Forest, Ill., assignor to Acme Steel Company, Chicago, Ill., a corporation of Illinois
Filed July 21, 1958, Ser. No. 750,034
11 Claims. (Cl. 248—361)

This invention relates generally to the art of strapping and particularly to an improved method and apparatus for securing objects together in a unitized group adapted for shifting positions when subject to shock.

For the past several years, it has been customary to secure loads in freight cars and other vehicles in such a manner that they are free to shift when subject to the shock of ordinary bumps and jolts incurred in transit. Restraints have been applied to these shiftable loads to limit the amounts of shift and these restraints have been in the form of slotted plates or cleats which are nailed to the feright car floor. The restraint or braking action which reduces the load shifting is achieved by passing the binder straps securing the load through the slots in the plates. When the plates are nailed to the freight car floor, the binder straps passing through the slots therein are necessarily caused to be offset and to follow an irregular path through the slots when the bound load is shifted in the car. This offset relationship creates the degree of interlock and frictional drag between the binder straps and the plates sufficient to create the required braking action to properly limit the amounts of load shifting. Since the slotted braking plates are applied to the same strap binders that encircle the bound objects, it is evident that the total length of shift permitted per bound object can be no longer than the length of the object. Usually the shift is even less because up to three slotted braking plates in series are ordinarily used, and since the plates are spaced from each other by about six inches in order to provide no more than one plate for each adjacent floor board of the freight car, the total shift permitted is reduced by the length of the plates used plus their spacing from each other. It is obvious from this that, so far, these slotted braking plates have been limited to use on longer loads and cannot be used at all on shorter ones where no extra length of binder strap is available to accommodate shifting.

It is therefore the principal object of this invention to provide an improved braked and bound load and method of loading which permits practically unlimited shifting of the bound load when subject to the bumps and shocks normally received by the freight car in which the load is situated.

It is another object to provide an improved braked bound load and method of loading which provides not only practically unlimited shifting, but which is also adapted for use on short loads of almost any length.

Other objects and advantages of the invention should be apparent when considered in the light of the attached drawings in which, FIG. 1 shows a perspective view of a shiftable unitized load embodying the features of the invention;

FIG. 2 shows a perspective view of another shiftable unitized load embodying the features of the invention;

FIG. 3 shows a sectional view along the line 3—3 of FIG. 1 and shows the binder straps and the units of the load separated from each other for the purpose of clearly showing the relative arrangement of parts, although the actual bound load would have all parts tightly brought together as shown in FIG. 1;

FIG. 4 shows a perspective view of a cutaway portion of the friction type strap joint used to brake the load when it is caused to shift; and FIG. 5 shows a perspective view of one-half of the strap joint shown in FIG. 4, and particularly shows a cross-section of the portion of the strap joint as viewed along the line 5—5.

A preferred embodiment of the invention is shown in FIG. 1 positioned in an ordinary freight car 1 having a floor 2 and vertical side walls 3. It consists of a group of three pallets or skids 4 which each consist of a flat frame or platform 5 supported on two runners or legs 6. The skids are arranged in series with each other in a row extending longitudinally of the freight car 1, although they could just as well be positioned transvserely. Two boards 7 are positioned parallel to each other and spaced apart for the width of the skids 4 and are used to maintain the skids in longitudinal alignment with each other. These boards 7 are nailed to the car floor 2. Supported on each of the skids 4 is one of three cylindrical objects 8 which may be coils of metal, rolls of paper, or any number of other similar shaped objects. As also shown in FIG. 3, the skids and coils are bound to each other successively by means of two binder strap loops 9 and 10. The strap loop 9 passes through the cores of the first two cylindrical objects 8 and portions of the platform 5 of the first two skids 4 while the second loop 10 is passed through the second and third cylindrical objects 8 and around portions of the second and third skids 4 in an identical manner as loop 9. When these straps are drawn up tightly, the skids 4 and the cylindrical objects 8 on them are brought from their separated positions, as shown in FIG. 3, closely together to their positions as shown in FIG. 1 so that they are bound as a unitized load. With the strap loops 9 and 10 drawn tightly, their overlapping ends are secured by means of a conventional strap joint 11 which can be made with any number of different type tools well known in the art.

Another loop 12 of binder strap is positioned to surround both of the loops 9 and 10, as shown best in FIG. 3, and when it is drawn tightly, it is secured to the other two strap loops 9 and 10 by means of two strap joints 13 and 14 which may be identical to strap joints 11. These joints are ordinarily provided, though not necessarily, with a tubular metal seal which is deformed with the strap ends to provide an interlocking type joint between the strap ends and the tubular seal.

The loop 12 of binder strap is provided with a lower length 15 which passes through an open type tubular seal 16 (FIGS. 4 and 5) which also surrounds a binder strap 17 to hold it in overlapping relationship with the strap length 15. With the two strap lengths 15 and 17 and the tubular seal 16 assembled in this manner, the seal and the overlapping strap ends are deformed by providing recesses 18, one along each edge of the assembled members. It is important that these deformed recesses are provided by pure bending without causing either the tubular seal 16 or the strap lengths 15 or 17 to be cut in any way, for it is essential that the interlocking in the region of the recesses 18 should be one of pure friction rather than an actual interference of cut tabs.

With the joint formed as shown in FIGS. 4 and 5, the two ends 19 and 20 of the strap 17 are secured to the freight car floor 2 by the use of two cleats or plates 21 and 22 at each end. The ends of the strap are looped about the plates 21 and brought beneath the plates 22. The plates 21 and 22 are brought close to each other and nailed to the car floor 2 by means of nails 23 passing through holes provided in the plates 21 and 22. The strap 17 is ordinarily applied with all slack removed from it.

With this loading arrangement, the mass and inertia of the load and the frictional contact of the load on the freight car floor may be sufficient to ordinarily restrain its displacement, but if the freight car in which the load is secured is subject to shock, by being bumped or jolted longitudinally of the car, the load tends to be shifted in either of the directions indicated by the arrows 24 and 25, depending upon from which direction the jolt is obtained, and the seal 16 also tends to be shifted along the strap 17. As this occurs, due to the recesses 18, the edges of the strap 17 are obliged to pass along irregular paths created by these recesses 18, with the result that frictional and bending forces are present in the region of the recesses 18 as the seal 16 is slid along the strap 17. These forces resist the tendency of the load to shift, and thereby act as a brake for it. In actual use, it has been found that all three parts, the tubular seal 16, the strap length 15 and the strap 17 may actually shift relative to each other. Further, it is desirable to make the seal of strong enough material that the bends in the seal caused by the recesses 18 are not ironed out, but rather the bends in the straps are continuously ironed in and out as the strap edges follow the irregular paths through the seal. In so doing, it is apparent that the tubular seal 16 can only be shifted on the strap length 15 until the tubular seal 16 reaches the corner regions 26 or 27 of the strap length 15. These corner regions 26 and 27 define the ordinary range of slippage available with the ordinary use of slotted braking plates. However, in the case of this invention, the seal 16 is not only free to slide for the length between the regions 26 and 27, but also for the entire length of the strap 17 which may extend for the entire length of the freight car. It is thereby independent of the load length and permits load shifting for almost any desired length. From this it should also be apparent that there is no lower limit to the shortness of the load other than the length of the tubular seal 16 which is usually shorter than the shortest object loaded. In order to increase the braking action, more than one tubular seal 16 can be used, or else more recesses 18 can be provided along the edges of the tubular seal 16 used. The number of seals 16 and recesses 18 required depends upon the weight of the load and the size of the seals and binder strap used and the ability of the seals and strap edges to resist bending as the straps are slipped relative to each other when the load is subject to shock.

Another embodiment of the invention is particularly shown in FIG. 2 and comprises a freight car floor 28 on which the load rests. A skid or pallet 29 is provided which has a platform 30 supported by two legs or runners 31 and 32. Two parallel boards 33 and 34 extending longitudinally of the freight car are nailed to the floor 28 and provide lateral guides for the skid 29. Four individual cylindrical objects 35, such as metal coils, are supported by the platform 30 and each of the coils 35 is bound together by means of its own binder straps 36. Across the tops of each set of two adjacent coils is a board 37 extending longitudinally of the car. A strap loop 38 surrounds each of the boards 37 and the two adjacent coils 35 and the portion of the platform 30 directly beneath them. This strap loop 38 is connected by means of a tubular seal 16a identical to the tubular seal 16 shown in FIGS. 4 and 5. It connects the lower strap length 38a of the strap loop 38 with another strap length 39 and it is provided with recesses 40 identical to recesses 18 shown in FIGS. 4 and 5. The length of strap 39 is secured at its ends 41 and 42 to opposite ends of the car floor 28 by means of plates 43 and 44 which are identical to the plates 21 and 22 shown in FIGS. 1 and 3 and they are secured to the floor by means of nails 45 in the same manner.

In this case, it should be noted that two straps 39 are provided because of the extra width of the load, but the braking action provided by the recesses 40 is identical to the braking action of the recesses 18 provided for the invention as shown in FIGS. 1, 3, 4 and 5.

Even though cylindrical objects have been shown as the major portions of the shiftable loads, it is obvious that other objects such as boxes, cartons or irregular objects such as pieces of machinery, etc., can be strapped in an identical manner and still obtain the same inherent advantages as when strapping cylindrical objects. It should be apparent that separate skid loads of objects can be bound together as described for the load shown in FIG. 1 and in other arrangements or else they can all be mounted on a single pallet or skid as shown in FIG. 2.

Although only two embodiments of the invention have been shown, it should be understood that the invention can be made in many other different ways without departing from the true scope of the invention, and the invention is equally applicable to loading on aircraft, barges, trucks or other vehicles.

I claim:

1. The method of securing a load to the wall of a transport vehicle comprising securing an encircling binder strap around a load and frictionally and slidably connecting said binder strap to a connection and frictionally and slidably connecting said connection to another strap whose ends are secured to spaced apart regions of said wall.

2. The method of securing a load to the wall of a transport vehicle comprising securing an encircling binder strap around a load and connecting said binder strap to a connection and frictionally and slidably connecting said connection to another strap whose ends are secured to spaced apart regions of said wall to ordinarily restrain displacement of the load, the resistance of said connection being small enough to permit relative slippage of the binder strap, the connection and the other strap to allow the load to be displaced parallel to the wall when subject to shock.

3. The method of securing a load comprising securing an encircling binder strap around a load and connecting said binder strap to a connection and frictionally and slidably connecting said connection to another strap which is aligned longitudinally of and has its ends secured to the load carrier to ordinarily restrain displacement of the load longitudinally of the freight car, the resistance of said connection being small enough to permit relative slippage between the binder strap, the connection and the other strap to allow the load to be displaced longitudinally when subject to shock.

4. The method of securing a load comprising securing an encircling binder strap around a load and connecting said binder strap to a connection and frictionally and slidably connecting said connection to another strap which is aligned longitudinally of and has its ends secured to the load carrier to ordinarily restrain displacement of the load longitudinally of the load carrier, the resistance of said connection being small enough to permit relative slippage between the binder strap, the connection and the other strap to allow the load to be displaced longitudinally when subject to shock, and confining said load laterally to prevent its lateral displacement.

5. The method of securing a load to the wall of a transport vehicle comprising binding together a plurality of load elements with a binder strap to provide a unitary load of sufficient mass and inertia to restrain displacement of the unitary load, connecting said binder strap by a connector to another strap whose ends are secured to spaced apart regions of said wall to further restrain displacement of the unitary load, the restraint of said connection being small enough to permit relative slippage of the binder strap, the connector and the other strap to allow the unitary load to be displaced parallel to the wall when subject to shock.

6. The method of securing a load comprising binding together a plurality of load elements with a binder strap to provide a unitary load of sufficient mass and inertia to restrain displacement of the unitary load, frictionally connecting said binder strap by a connector to another strap which is aligned longitudinally of and has its ends secured to the load carrier to ordinarily further restrain displacement of the unitary load, the frictional resistance of said frictional connection being small enough to permit relative slippage between the binder strap, the connector and the other strap to allow the unitary load to be displaced longitudinally when subject to shock.

7. The method of securing a load comprising binding together a plurality of load elements with a binder strap to provide a unitary load of sufficient mass and inertia to restrain displacement of the unitary load, frictionally connecting said binder strap by a connector to another strap which is aligned longitudinally of and has its ends secured to the load carrier to ordinarily further restrain displacement of the unitary load, the frictional resistance of said frictional connection being small enough to permit relative slippage between the binder strap, the connector and the other strap to allow the unitary load to be displaced longitudinally when subject to shock, and confining said unitary load to prevent its lateral displacement.

8. A secured load comprising a load of one or more objects held together by means of an encircling binder strap secured around the load, another strap extending longitudinally of the load carrier and having its ends secured to the load carrier, a metal seal encircling portions of both straps, said metal seal and portions of the straps being deformed to provide an interlocking connection between the seal and strap portions, said connection ordinarily restraining displacement of the load, but permitting relative slippage of the two straps to allow the load to be displaced when subject to shock.

9. A secured load comprising a load of one or more objects held together by means of an encircling binder strap secured around the load, another strap secured at its ends to the load carrier, a connection provided between the two straps to ordinarily restrain displacement of the load, but permitting relative slippage between the two straps and the connection to allow the load to be displaced when subject to shock.

10. A secured load comprising a load of one or more objects held together by means of an encircling binder strap secured around the load, another strap secured at its ends to the load carrier, a metal seal encircling portions of both straps to hold the strap portions in proximate overlapping relationship, the lateral margins of the metal seal and the strap portions being deformed to provide a close engagement between the seal and strap portions, said engagement restraining displacement of the load by ordinarily preventing relative slippage between the straps, but said engagement being overcome to allow relative slippage between the straps and displacement of the load when subject to shock.

11. A secured load comprising a load of one or more objects held together by means of an encircling binder strap, said binder strap being frictionally connected to another strap whose ends are secured to the load carrier, said frictional connection allowing slippage between the straps and connection when the load is subject to shock.

References Cited in the file of this patent

UNITED STATES PATENTS

| | | |
|---|---|---|
| 1,920,917 | Scales | Aug. 1, 1933 |
| 2,032,591 | Pride | Mar. 3, 1936 |
| 2,675,936 | Ridge | Apr. 20, 1954 |